(12) United States Patent
Zhang et al.

(10) Patent No.: US 7,266,002 B2
(45) Date of Patent: Sep. 4, 2007

(54) VOLTAGE-VOLTAGE CONVERTER FOR INTEGRATED CIRCUITS

(76) Inventors: Ming Zhang, 7, Allée Jacques Bainville, 94300 Vincennes (FR); Nicolas Llaser, 7, Allée Jacques Bainville, 94300 Vincennes (FR)

( * ) Notice: Subject to any disclaimer, the term of this patent is extended or adjusted under 35 U.S.C. 154(b) by 109 days.

(21) Appl. No.: 10/522,738

(22) PCT Filed: Jul. 25, 2003

(86) PCT No.: PCT/FR03/02351

§ 371 (c)(1),
(2), (4) Date: Oct. 7, 2005

(87) PCT Pub. No.: WO2004/013949

PCT Pub. Date: Feb. 12, 2004

(65) Prior Publication Data

US 2006/0105586 A1   May 18, 2006

(30) Foreign Application Priority Data

Jul. 30, 2002   (FR) .................................. 02 09653

(51) Int. Cl.
*H02M 3/07* (2006.01)
(52) U.S. Cl. .......................................... 363/60; 363/65
(58) Field of Classification Search .................. 363/59, 363/60, 65
See application file for complete search history.

(56) References Cited

U.S. PATENT DOCUMENTS 5,969,961 A * 10/1999 Yero ............................ 363/60

7,091,769 B2 * 8/2006 Kwon et al. ................ 327/535

FOREIGN PATENT DOCUMENTS

WO    WO 02/43232    5/2002

OTHER PUBLICATIONS

XP-02241539: "An Experimental 1.5V 64-Mb DRAM" by Yoshinobu Nakagome, et al. *IEEE Journal of Solif-State Circuits*, vol. 26, No. 4; pp. 465-472; Apr. 1991.
"On-Chip High-Voltage Generation in MNOS Integrated Circuuits Using an Improved Voltage Multiplier Technique" by John F. Dickson. *IEEE Journal of Solid-State Circuits*, vol. SC-11, No. 3; pp. 374-378; Jun. 1976.

* cited by examiner

*Primary Examiner*—Jeffrey Sterrett
(74) *Attorney, Agent, or Firm*—Clark & Brody

(57) ABSTRACT

A voltage/voltage converter for integrated circuits is characterized in that it presents a multistage symmetrical structure and comprises at least one input stage constituted by a clock booster circuit (CB) of symmetrical structure which delivers two output voltages, a voltage multiplier stage of symmetrical structure comprising two voltage multiplier circuits ($CM_i$; $CM_{ip}$) respectively connected in two branches ($B_1$; $B_2$) of the converter and having applied respectively thereto the output voltages from the first stage, and an output stage (S) constituted by a multiplexer circuit (MX) having applied thereto the two output voltages from the voltage multiplier stage. The invention is particularly applied to EEPROMs and to low-voltage integrated circuits.

21 Claims, 8 Drawing Sheets

VOLTAGE-VOLTAGE CONVERTER FOR INTEGRATED CIRCUITS

FIELD OF INVENTION

The invention relates to a voltage/voltage converter for integrated circuits and it finds application in particular in making electrically erasable programmable read-only memories (EEPROMs) and low voltage integrated circuits.

BACKGROUND OF THE INVENTION

In general, the first circuit based on the charge transfer principle to enable a voltage/voltage converter to be made on an integrated circuit was proposed by Mr. J. F. Dickson in an article entitled "On-chip high-voltage generation in NMOS integrated circuits using an improved voltage multiplier technique" which was published in June 1976 in the journal "IEEE J. Solid-State Circuits, Vol. 11, pp. 374-376". That circuit referred to below as the "Dickson" circuit presents a structure that is not symmetrical and that is constituted by capacitors and NMOS transistors connected as diodes. The function of the capacitors is to store electric charge, whereas that of the transistors is to act as switches to control charging of the capacitors and to transfer charge between capacitors. Since the publication of that article, most voltage/voltage converters of non-symmetrical structure have been implemented on the basis of the above-mentioned Dickson circuit, but they suffer in particular from the drawback of leading to a loss of voltage due to imperfections in the NMOS transistor switches.

Elsewhere, a "Clock Booster" circuit implemented in CMOS technology is described in an article entitled "An experimental 1.5 V 64 Mb DRAM" published in April 1991 in Volume 26, pp. 465-472 of the above-mentioned journal, with such a circuit of geometrical structure enabling a direct current (DC) component to be added to a clock signal. That circuit is referred to below as the clock booster circuit.

In general, integrated CMOS voltage/voltage converters are used in two main fields in particular, specifically: EEPROMs, also referred to as FLASHROMs, and low-voltage integrated circuits in order to feed certain portions of such circuits with higher voltages EEPPROMs are presently used in numerous consumer applications such as, for example: digital cameras, MP3 digital audio players, and pocket computers, and demand for memories of this type has increased considerably over the last few years. Low-voltage integrated circuits are also in full expansion and are used in particular in consumer products such as cell phones and the above-mentioned portable appliances.

Specifically, the technical problem to be solved is for the output voltage from the converter to be increased as much as possible for a given number of stages. With a portable appliance powered at 3 volts (V) from a battery, for example, it is necessary to obtain a programming voltage of 9 V in order to be able to store information in a memory of the FLASHROM type.

In theory, if a voltage/voltage converter were perfect, then a two-stage voltage tripler would suffice to produce such a 9-V programming voltage. Unfortunately, experience shows that a voltage/voltage converter of non-symmetrical structure implemented on the basis of the Dickson circuit needs to be a three-stage voltage quadrupler in order to produce the above-specified programming voltage.

In the prior art, document WO 02/43232 describes a voltage/voltage converter in accordance with the pre-characterizing portion of claim 1.

BRIEF SUMMARY OF THE INVENTION

Since present voltage/voltage converters are limited in performance, the invention seeks to devise a novel voltage/voltage converter structure capable of satisfying various objectives, and in particular:

eliminating voltage loss at the output from the converter due to the imperfection of switches made using MOS transistors;

enable multistage configurations to be provided;

achieve a maximum output voltage that is close to the theoretical output voltage;

minimize total surface area of the converter for equivalent performance; and operate over a broad range of power supply voltages, e.g. 1.2 V to 5 V using standard technology.

To achieve these objectives, the invention provides a voltage/voltage converter for integrated circuits, the converter presenting a symmetrical multistage structure and comprising at least one input stage constituted by a clock booster circuit of symmetrical structure which delivers two output voltages, a voltage multiplier circuit of symmetrical structure comprising two voltage multiplier circuits respectively connected in two branches of the converter and having the output voltages of the input stage applied respectively thereto, and an output stage constituted by a multiplexer circuit having the two output voltages from the voltage multiplier stage applied thereto, the converter being characterized in that each voltage multiplier circuit is controlled by a control circuit, and in that each voltage multiplier circuit supplies voltages needed both for the operation of its own control circuit and for the operation of the control circuit of the other voltage multiplier circuit of the same stage.

In general:

the clock booster circuit serves to add a DC component to a clock signal, and it comprises two similar circuits receiving respective clock signals of opposite phase;

each voltage multiplier circuit comprises a capacitor and a switch for controlling charging of the capacitor and transfer of its charge to the voltage multiplier circuit of the following stage; and each voltage multiplier circuit is controlled by a control circuit and delivers voltages needed both for the operation of its own control circuit and for the operation of the control circuit of the other voltage multiplier circuit of the same stage.

The converter of the invention may have a positive output, in which case the multiplexer circuit recovers the highest voltages from the voltage multiplier circuits, and, by switching, extracts therefrom the highest DC voltage that forms the output voltage from the converter.

Conversely, the converter may have a negative output, in which case the multiplexer circuit recovers the lowest voltages from the voltage multiplier circuits, and by switching, extracts therefrom the lowest DC voltage which forms the output voltage of the converter.

Thus, the structure of the voltage/voltage converter of the invention enables the advantages of a symmetrical structure to be conserved. The Applicants have undertaken tests and have been able to demonstrate that, in comparison with a voltage/voltage converter of non-symmetrical structure, a converter of symmetrical structure provides improved performance, in particular for applications on a resistive load. More precisely, a converter of symmetrical structure holds charge better, and as a result the smoothing capacitor that needs to be added to the output can be of lower capacitance, thus enabling the total surface area of the converter to be reduced. Furthermore, for a given value of resistive load and for the same ripple tolerance in the output voltage, the output voltage rises quicker than with a non-symmetrical structure.

The voltage/voltage converter structure of the invention also makes it possible to reduce the effect of stray capacitance in order to obtain better efficiency and a higher output voltage. This result is obtained by using voltage multiplier circuits based on the Dickson circuit structure, even though the Applicants made their initial tests on a voltage/voltage converter using a capacitor-stacking technique.

The invention thus makes it possible to implement a voltage/voltage converter having a positive output or a negative output that is the result of a compromise found from known symmetrical and non-symmetrical structures by combining them in an original manner after performing numerous laboratory tests.

BRIEF DESCRIPTION OF THE DRAWING

Other advantages, characteristics, and details of the invention appear from the following additional description made with reference to the drawings given purely by way of example and in which.

DETAILED DESCRIPTION OF THE DRAWING

Figure 1:
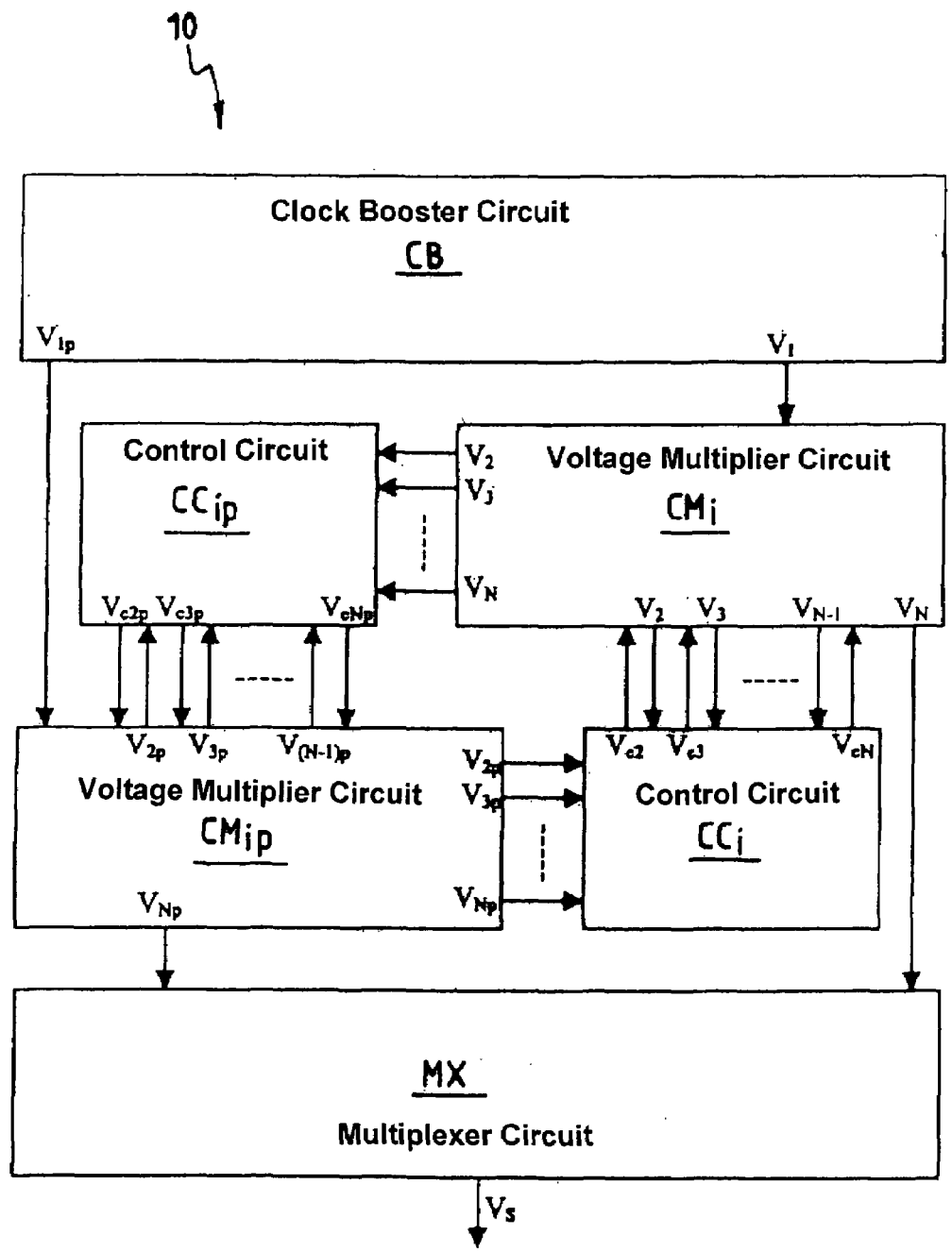
FIG. 1 is a block diagram showing the general structure of a voltage/voltage converter in accordance with the invention.

The general structure of a voltage/voltage converter of the invention is shown in FIG. 1, it being understood that this converter 10 presents a structure that is symmetrical, that has a plurality of stages, and that has an output voltage that can be positive or negative. More precisely, the converter comprises at least N stages connected in cascade, the first stage being constituted by a clock booster circuit CB of symmetrical structure. Each of the following (N−1) intermediate stages is constituted by two voltage multiplier circuits $CM_i$ and $CM_{ip}$ (where i lies in the range 2 to N) that form a symmetrical structure. These two voltage multiplier circuits are controlled respectively by two control circuits $CC_i$ and $CC_{ip}$ which deliver control voltages $V_{ci}$ and $V_{cip}$ (where i lies in the range 2 to N). Each voltage multiplier circuit uses the charge transfer technique of the Dickson circuit mentioned in the introduction, and delivers both a fraction of the voltages needed for the operation of its own control circuit and a fraction of the voltages needed for the operation of the operation of the other multiplier circuit. Finally, the voltage/voltage converter presents an output stage S which is constituted by a multiplexer circuit MX receiving the output voltages $V_N$ and $V_{Np}$ from the two multiplier circuits $CM_N$ and $CM_{Np}$ of the last intermediate stage in order to reconstitute a DC output voltage $V_s$.

All of these stages are described in detail below with reference to FIGS. 2 to 9 which show several embodiments.

Figure 2:
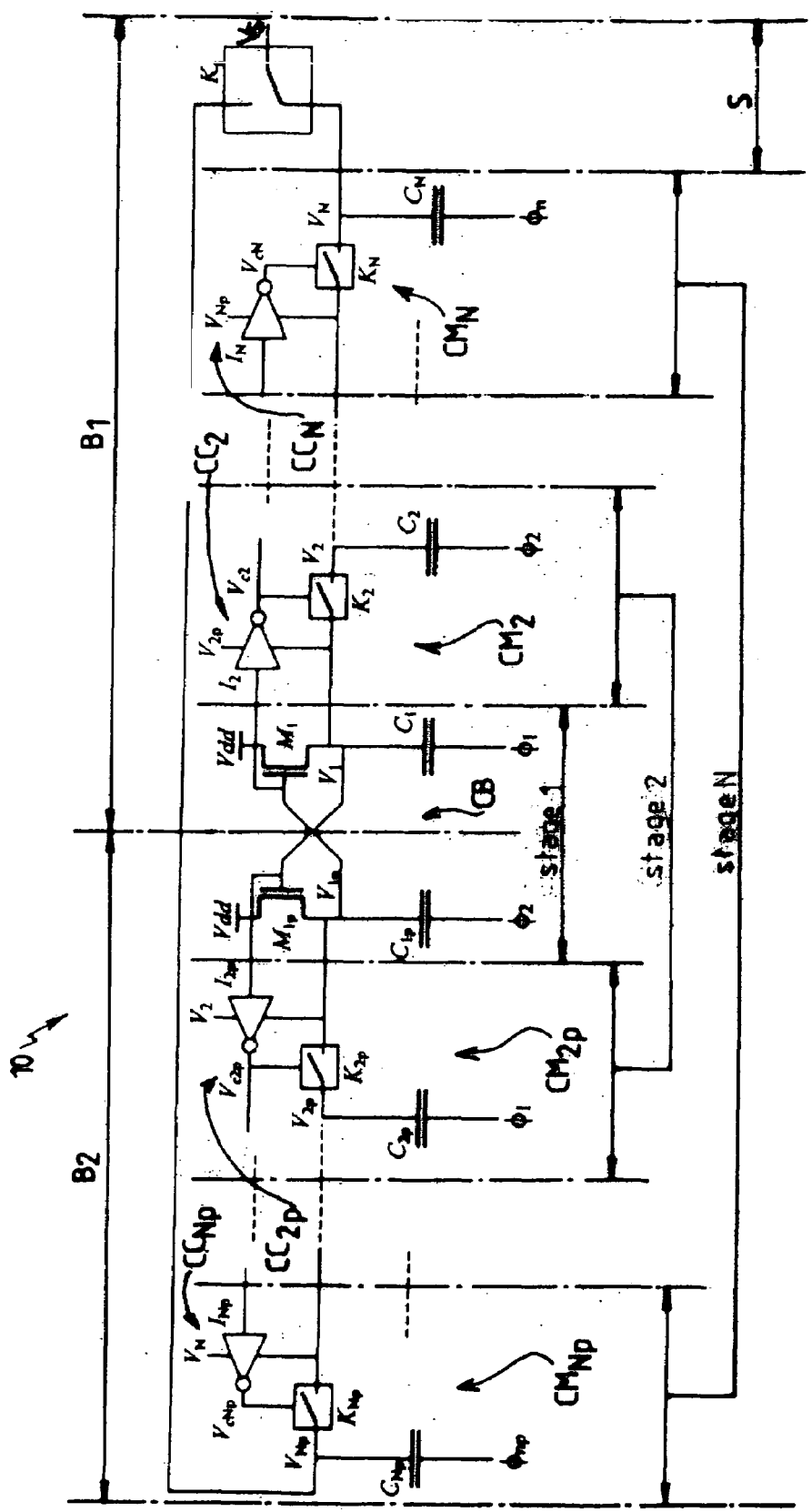
FIG. 2 shows a first embodiment of a voltage/voltage converter in accordance with the invention and having a positive output.

In a first embodiment shown in FIG. 2, the voltage/voltage converter 10 has a positive output, presents a symmetrical structure with two branches $B_1$ and $B_2$, and comprises a plurality of stages. The first or input stage is a clock booster circuit CB of symmetrical structure and having a positive output, comprising an NMOS type transistor $M_1$ and a capacitor $C_1$ for the branch $B_1$ of the converter 10, and an NMOS type transistor $M_{1p}$ and a capacitor $C_{1p}$ for the branch $B_2$ of the converter 10. The transistors $M_i$ and $M_{ip}$ have their drains connected to a power supply voltage $V_{dd}$, and have their sources connected respectively to the positive electrodes of the capacitors $C_1$ and $C_{1p}$. The grid of transistor $M_1$ is connected to the source of transistor $M_{1p}$, and vice versa. The negative electrodes of the capacitors $C_1$ and $C_{1p}$ are connected respectively to two clock signals $\phi_1$ and $\phi_2$ which are in phase opposition.

The following (N−1) stages are connected in cascade, each comprising two voltage multiplier circuits $CM_i$ and $CM_{ip}$ (where i lies in the range 2 to N) respectively connected in the two branches $B_1$ and $B_2$ of the converter 10 in order to form a symmetrical structure, each multiplier circuit reproducing the structure based on the Dickson circuit.

Each voltage multiplier circuit $CM_i$ of the branch $B_1$ comprises a capacitor $C_i$ with its positive electrode connected to the output terminal of a switch $K_i$ via a node $V_i$, and with its negative electrode connected to a clock signal $\phi_n$. In similar manner, each voltage multiplier circuit $CM_{ip}$ of the branch $B_2$ comprises a capacitor $C_{ip}$ whose positive electrode is connected to the output terminal of a switch $K_{ip}$ via node $V_{ip}$ and whose negative electrode is connected to a clock signal $\phi_{np}$ (i lying in the range 2 to N). The clock signal $\phi_n$ corresponds to the clock signal $\phi_1$ of the clock booster circuit CB if i is odd and to the signal $\phi_2$ of the clock booster circuit CB if i is even, and vice versa for the clock signal $\phi_{np}$, these two clock signals $\phi_1$ and $\phi_2$ corresponding to those received by the clock booster circuit CB. The input terminal of the switch $K_i$ of the branch $B_1$ of the converter 10 is connected to the node $V_{i-1}$ of the preceding stage, whereas the input terminal of the switch $K_{ip}$ of the branch $B_2$ of the converter 10 is connected to the node $V_{(i-1)p}$ of the preceding stage.

Each control circuit $CC_i$ of a voltage multiplier $CM_i$ of the branch $B_1$ of the converter 10 comprises an inverter circuit $I_i$ whose output voltage delivers the control voltage $V_{ci}$ that is applied to the control input of the switch $K_i$ of the voltage multiplier circuit $CM_i$ (i lying in the range 2 to N). Each inverter circuit $I_i$ is powered both by the output voltage $V_{i-1}$ of the multiplier circuit $CM_{i-1}$ of the preceding stage in the branch $B_1$ of the converter 10, and by the output voltage $V_{ip}$ of the voltage multiplier circuit $CM_{ip}$ of the corresponding stage of the branch $B_2$ of the converter 10. It is important to observe that although the output voltage $V_{i-1}$ (apart from the voltage $V_1$) is supplied by the multiplier circuit $CM_{i-1}$ of the branch $B_1$ of the converter 10, the voltage $V_{ip}$ is supplied by the voltage multiplier circuit $CM_{ip}$ of the same stage but in the branch $B_2$ of the converter 10. The inverter $I_i$ is controlled by an input signal which is constituted by the output signal $V_{c(i-1)}$ of the preceding stage (i lying in the range 3 to N) in order to obtain an output signal $V_{ci}$, it being understood that the inverter $I_2$ is controlled by the output signal $V_{1p}$ of the branch $B_2$ of the clock booster circuit CB of the first stage of the converter 10.

Symmetrically, each control circuit $CC_{ip}$ of a voltage multiplier circuit $CM_{ip}$ of the branch $B_2$ of the converter 10 comprises an inverter circuit $I_{ip}$ whose output voltage supplies the control voltage $V_{cip}$ applied to the control input of the switch $K_{ip}$ of the voltage multiplier circuit $CM_{ip}$ (i lying in the range 2 to N). Each inverter circuit $I_{ip}$ is powered between the output voltage $V_{(i-1)p}$ of the voltage multiplier circuit $CM_{(i-1)p}$ of the preceding stage of the branch $B_2$ of the converter 10, and the output voltage $V_i$ of the voltage multiplier circuit $CM_i$ of the corresponding stage of the branch $B_1$ of the converter 10. As before, it is important to observe that although the output voltage $V_{(i-1)p}$ (apart from the voltage $V_{1p}$) is provided by the voltage multiplier circuit $CM_{(i-1)p}$ of the branch $B_2$ of the converter 10, the voltage $V_i$ is supplied by the voltage multiplier circuit $CM_i$ of the same stage but in the branch $B_1$ of the converter 10. The inverter $I_{ip}$ is controlled by an input signal which is constituted by the output signal $V_{c(i-1)p}$ of the preceding stage (i lying in the range 3 to N) in order to obtain an output signal $V_{cip}$, it being understood that the inverter $I_{2p}$ is controlled by the output signal $V_1$ of the branch $B_1$ of the clock booster circuit CB of the first stage of the converter 10.

Figure 4:
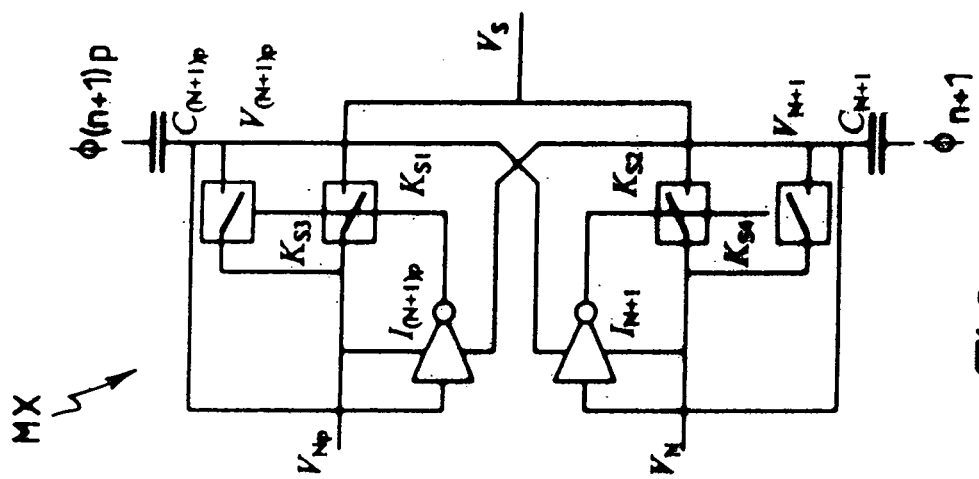
FIGS. 3 and 4 show two respective multiplexer circuits, each suitable for constituting the output stage of the positive output voltage/voltage converter of FIG. 2.
Figure 3:
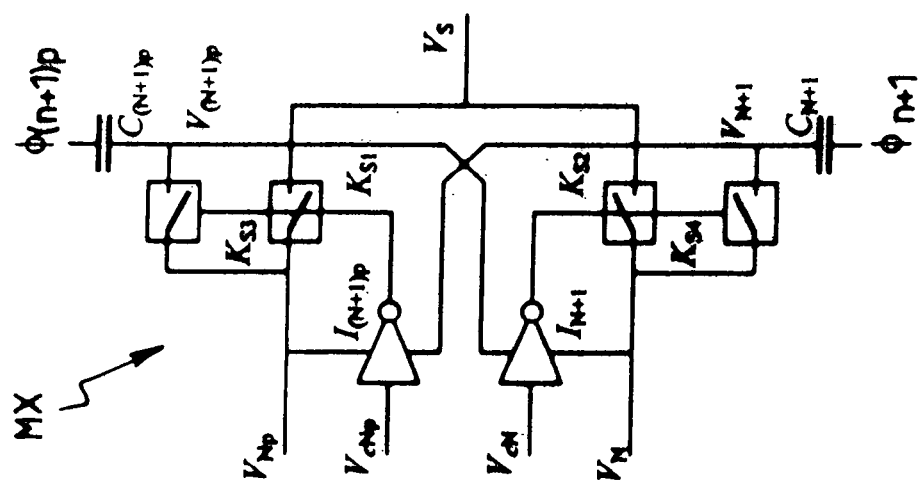

The multiplexer circuit MX which constitutes the output stage S of the voltage/voltage converter 10 of FIG. 2 can be implemented in two different ways as shown in FIGS. 3 and 4. The function of the multiplexer circuit MX is to retrieve the highest voltages from the voltage multiplier circuit and, by switching, to extract therefrom the highest DC voltage which forms the output voltage from the converter.

In the first embodiment shown in FIG. 3, the multiplexer circuit MX is based on using two switches $K_{s1}$ and $K_{s2}$ which, on the output side, share a common output node corresponding to the output voltage $V_s$ of the converter 10, and on the input side, are connected respectively to the two output voltages $V_{Np}$ and $V_N$ of two multiplier circuits $CM_{Np}$ and $CM_N$ of the stage N of the converter 10. The multiplexer circuit MX also comprises an auxiliary circuit for producing the control signals for the two switches $K_{s1}$ and $K_{s2}$, this auxiliary circuit being constituted by two inverter circuits $I_{(N+1)p}$ and $I_{N+1}$, two switches $K_{s3}$ and $K_{s4}$, and two capacitors $C_{(N+1)p}$ and $C_{N+1}$.

The switch $K_{s3}$ shares the same control and input signals as the switch $K_{s1}$, while the switch $K_{s4}$ shares the same control and input signals as the switch $K_{s2}$. However the switch $K_{s3}$ is connected between the output voltage $V_{Np}$ of the multiplier circuit $CM_{Np}$ of the branch $B_2$ of the stage N of the converter 10 and the positive electrode of the capacitor $C_{(N+1)p}$ whose negative electrode is boosted by the clock signal $\phi_{(n+1)p}$. Symmetrically, the switch $K_{s4}$ is connected between the output voltage $V_N$ of the multiplier circuit $CM_N$ of the branch $B_1$ of the stage N of the converter 10 and the positive electrode of the capacitor $C_{N+1}$ whose negative electrode is boosted by the clock signal $\phi_{n+1}$.

The input signal of the inverter circuit $I_{(N+1)p}$ is the control signal $V_{cNp}$ of the voltage multiplier circuit $CM_{Np}$ of the stage N of the branch $B_2$ of the converter 10, and it is powered between the output voltage $V_{Np}$ as its low power supply voltage and the output voltage $V_{N+1}$ as its high power supply voltage. Symmetrically, the inverter circuit $I_{N+1}$ has as its input signal the control signal $V_{cN}$ of the multiplier circuit $CM_N$ of the stage N of the branch $B_1$ of the converter 10, and it is powered between the output voltage $V_N$ as its low power supply voltage and the voltage $V_{(N+1)p}$ as its high power supply voltage.

In the second embodiment of FIG. 4, the multiplexer circuit MX has the same overall structure as that shown in FIG. 3. The only difference lies in the fact that the input signal to the inverter circuit $I_{(N+1)p}$ is the signal $V_{(N+1)p}$ instead of the signal $V_{cNp}$, and the input signal of the inverter circuit $I_{N+1}$ is the signal $V_{N+1}$ instead of the signal $V_{cN}$.

Figure 5:
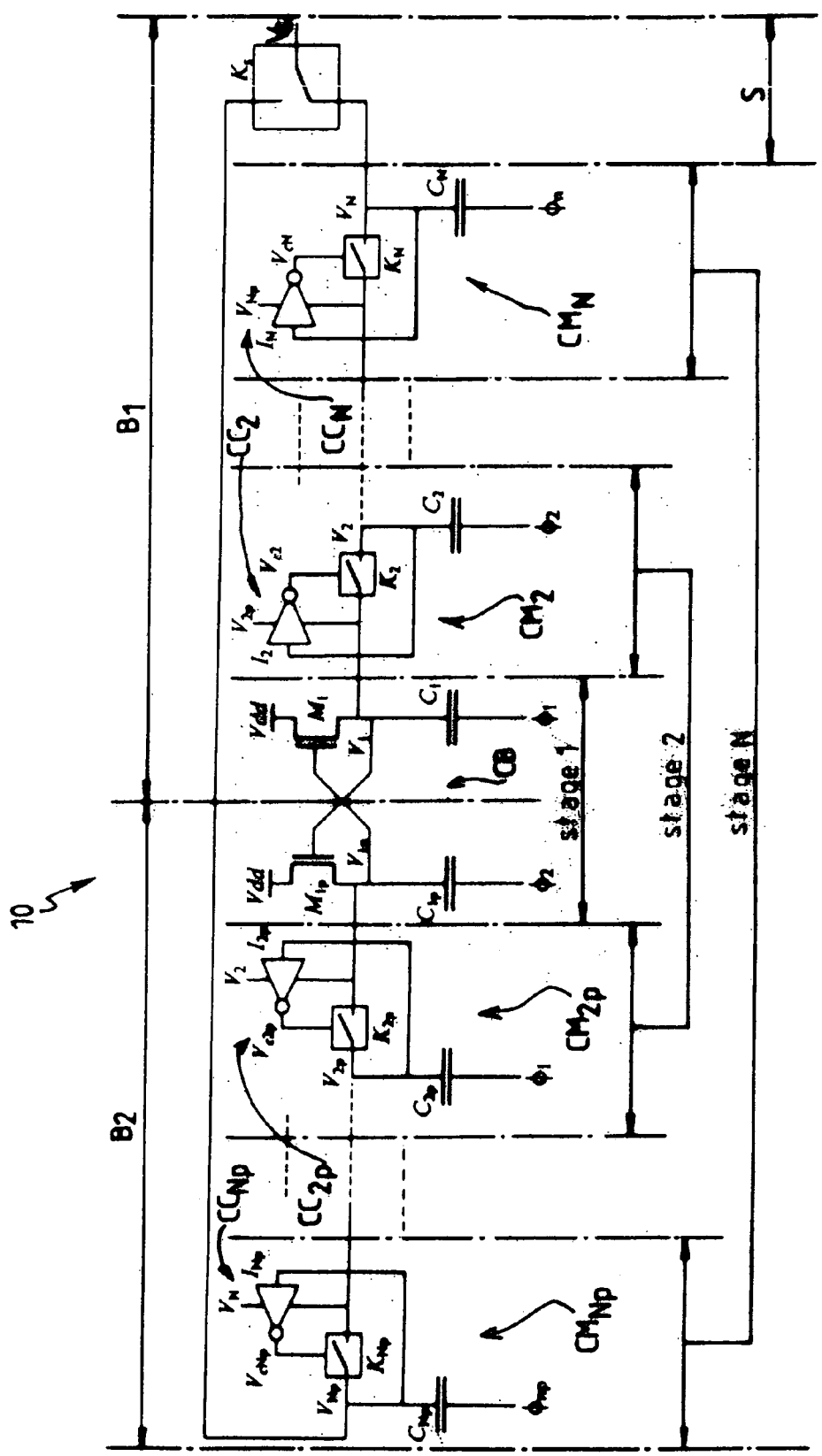
FIG. 5 shows a second embodiment of a voltage/voltage converter in accordance with the invention and having a positive output.

In a second embodiment shown in FIG. 5, which constitutes a variant of the embodiment shown in FIG. 2, the voltage/voltage converter 10 likewise presents a positive output, and it differs solely in the control circuit $CC_i$ and $CC_{ip}$ for controlling the voltage multiplier circuit $CM_i$ and $CM_{ip}$ (i lying in the range 2 to N). More precisely, the inverter circuit $I_i$ of each control circuit $CC_i$ is powered between the output voltages $V_{i-1}$ and $V_{ip}$, it being understood that the output voltage $V_{i-1}$ is the voltage produced by the voltage multiplier circuit $CM_{i-1}$ of the preceding stage of the branch $B_1$ of the converter 10, and the output voltage $V_{ip}$ is the voltage produced by the voltage multiplier circuit $CM_{ip}$ of the corresponding stage of the branch $B_2$ of the converter 10. The input of each inverter circuit $I_i$ is controlled by the output signal $V_i$ of the voltage multiplier circuit $CM_i$ to produce the output signal $V_{ci}$. Symmetrically, the inverter circuit $I_{ip}$ of each control circuit $CC_{ip}$ is powered between the output voltages $V_{(i-1)p}$ and $V_i$, it being understood that the output voltage $V_{(i-1)p}$ is produced by the voltage multiplier circuit $CM_{(i-1)p}$ of the preceding stage of the branch $B_2$ of the converter 10, and the output voltage $V_i$ is the voltage produced by the voltage multiplier circuit $CM_i$ of the corresponding stage of the branch $B_1$ of the converter 10. The input of each inverter circuit $I_{ip}$ is controlled by the output signal $V_{ip}$ from the voltage multiplier circuit $CM_{ip}$ in order to produce the output signal $V_{cip}$.

Like the first embodiment shown in FIG. 2, the multiplexer circuit MX which forms the output stage of the converter 10 can be implemented using either of the two embodiments shown in FIGS. 3 and 4.

Figure 6:
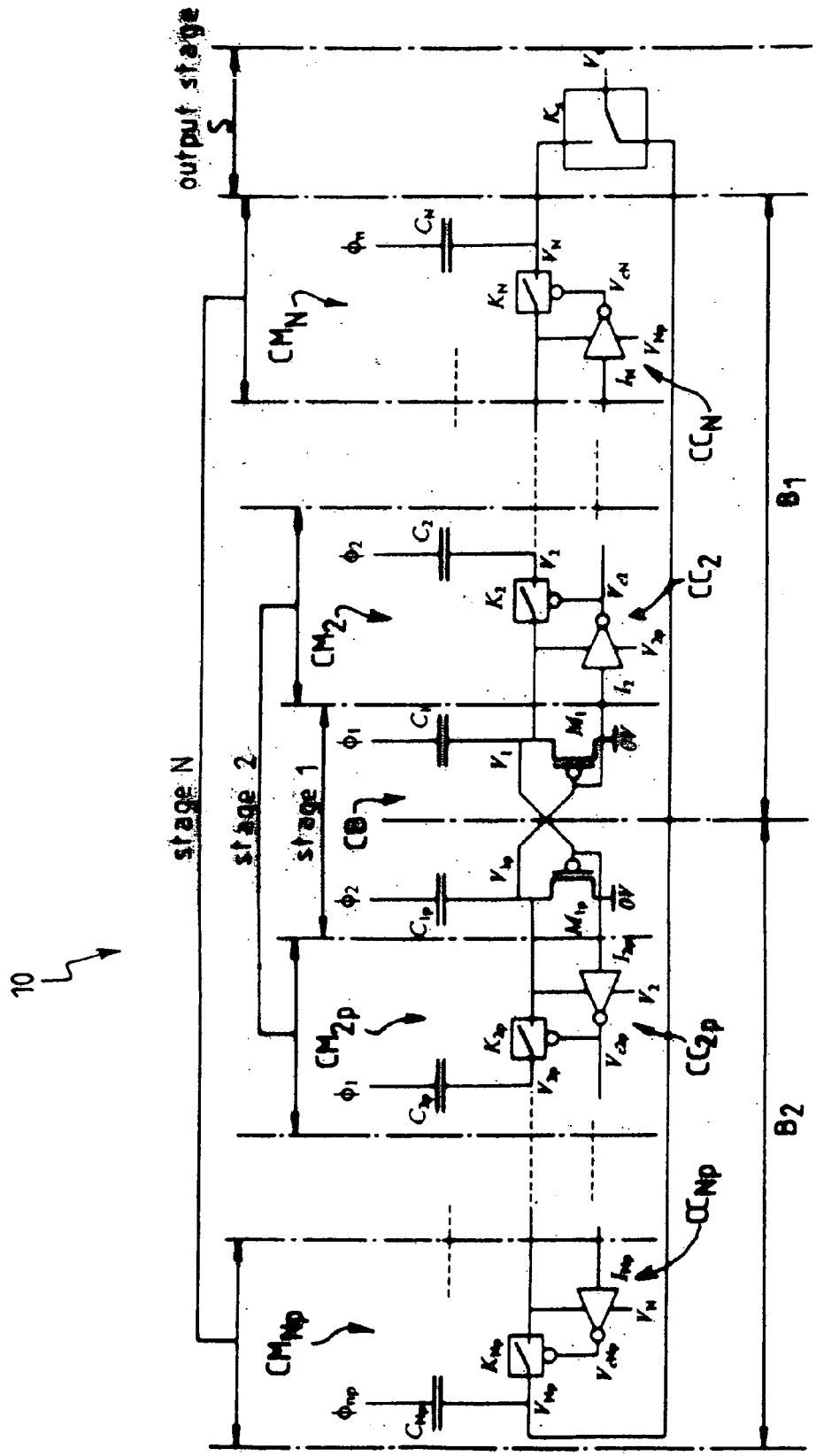
FIG. 6 shows a first embodiment of a voltage/voltage converter in accordance with the invention and having a negative output.

FIG. 6 shows a first embodiment of a voltage/voltage converter in accordance with the invention but having a negative output, it being understood that it likewise presents a plurality of stages and a symmetrical structure with two branches $B_1$ and $B_2$. The first or input stage is a clock booster circuit of symmetrical structure with a negative output, comprising a PMOS type transistor $M_1$ and a capacitor $C_1$ for the branch $B_1$ of the converter 10, and a PMOS type transistor $M_{1p}$ and a capacitor $C_{1p}$ for the branch $B_2$ of the converter 10. The transistors $M_1$ and $M_{1p}$ have their drains connected to a zero volt ground, and they have their sources connected respectively to the negative electrodes of the capacitors $C_1$ and $C_{1p}$. The grid of transistor $M_1$ is connected to the source of transistor $M_{1p}$, and vice versa. The positive electrodes of the capacitors $C_1$ and $C_{1p}$ are respectively connected to two clock signals $\phi_1$ and $\phi_2$ which are in phase opposition.

Each of the following (N–1) stages that are connected in cascade comprises two voltage multiplier circuits $CM_i$ and $CM_{ip}$ (i lying in the range 2 to N) respectively connected in the two branches $B_1$ and $B_2$ of the converter 10 in order to form a structure that is symmetrical, each voltage multiplier circuit reproducing the basic structure of the Dickson circuit. 10 Each voltage multiplier circuit $CM_i$ of the branch $B_1$ comprises a capacitor $C_i$ whose negative electrode is connected to the output terminal of a switch $K_i$ via a node $V_i$, and whose positive electrode is connected to a clock signal $\phi_n$. Similarly, each voltage multiplier circuit $CM_{ip}$ of the branch $B_2$ comprises a capacitor $C_{ip}$ whose negative electrode is connected to the output terminal of a switch $K_{ip}$ via a node $V_{ip}$ and whose positive electrode is connected to a clock signal $\phi_{np}$ (i lying in the range 2 to N). The clock signal $\phi_n$ corresponds to the clock signal $\phi_1$ of the clock booster circuit CB if i is odd and to the signal $\phi_2$ of the clock booster circuit CB if i is even, and vice versa for the clock signal $\phi_{np}$, these two clock signals $\phi_1$ and $\phi_2$ corresponding to those received by the clock booster circuit CB. The input terminal of the switch $K_i$ of the branch $B_1$ of the converter 10 is connected to the node $V_{i-1}$ of the preceding stage, while the input terminal of the switch $K_{ip}$ of the branch $B_2$ of the converter 10 is connected to the node $V_{(i-1)p}$ of the preceding stage.

Each control circuit $CC_i$ of a voltage multiplier circuit $CM_i$ of the branch $B_1$ of the converter 10 comprises an inverter circuit $I_i$ whose output voltage supplies the control voltage $V_{ci}$ that is applied to the control input of the switch $K_i$ of the voltage multiplier circuit $CM_i$ (i lying in the range 2 to N). Each inverter circuit $I_i$ is powered between the output voltage $V_{ip}$ of the voltage multiplier circuit $CM_{ip}$ of the corresponding stage of the branch $B_2$ of the converter 10, and the output voltage $V_{i-1}$ of the multiplier circuit $CM_{i-1}$ of the preceding stage of the branch $B_1$ of the converter 10. It is important to observe that although the output voltage $V_{i-1}$ (apart from the voltage $V_1$) is supplied by the voltage multiplier circuit $CM_{i-1}$ of the branch $B_1$ of the converter 10, the voltage $V_{ip}$ is supplied by the voltage multiplier circuit $CM_{ip}$ of the same stage but in the branch $B_2$ of the converter 10. The inverter $I_i$ is controlled by an input signal which is constituted by the output signal $V_{c(i-1)}$ of the preceding stage (i lying in the range 3 to N) in order to obtain an output signal $V_{ci}$, it being understood that the inverter $I_2$ is controlled by the output signal $V_{1p}$ of the branch $B_2$ of the clock booster circuit CB of the first stage of the converter 10.

Symmetrically, each control circuit $CC_{ip}$ of a voltage multiplier $CM_{ip}$ in the branch $B_2$ of the converter 10 comprises an inverter circuit $I_{ip}$ whose output voltage supplies the control voltage $V_{cip}$ applied to the control input of the switch $K_{ip}$ of the voltage multiplier circuit $CM_{ip}$ (i lying in the range 2 to N). Each inverter circuit $I_{ip}$ is powered between the output voltage $V_i$ of the voltage multiplier circuit $CM_i$ of the corresponding stage of the branch $B_1$ of the converter 10, and the output voltage $V_{(i-1)p}$ of the voltage multiplier circuit $CM_{(i-1)p}$ of the preceding stage of the branch $B_2$ of the converter 10. As before, it is important to observe that although the output voltage $V_{(i-1)p}$ (apart from the voltage $V_{1p}$) is supplied by the voltage multiplier circuit $CM_{(i-1)p}$ of the branch $B_2$ of the converter 10, the voltage $V_i$ is supplied by the voltage multiplier circuit $CM_i$ of the same stage, but of the branch $B_1$ of the converter 10. The inverter $I_{ip}$ is controlled by an input signal which is constituted by the output signal $V_{c(i-1)p}$ of the preceding stage (i lying in the range 3 to N) in order to obtain an output signal $V_{cip}$, it being understood that the inverter $I_{2p}$ is controlled by the output signal $V_1$ of the branch $B_1$ of the clock booster circuit CB of the first stage of the converter 10.

Figure 8:
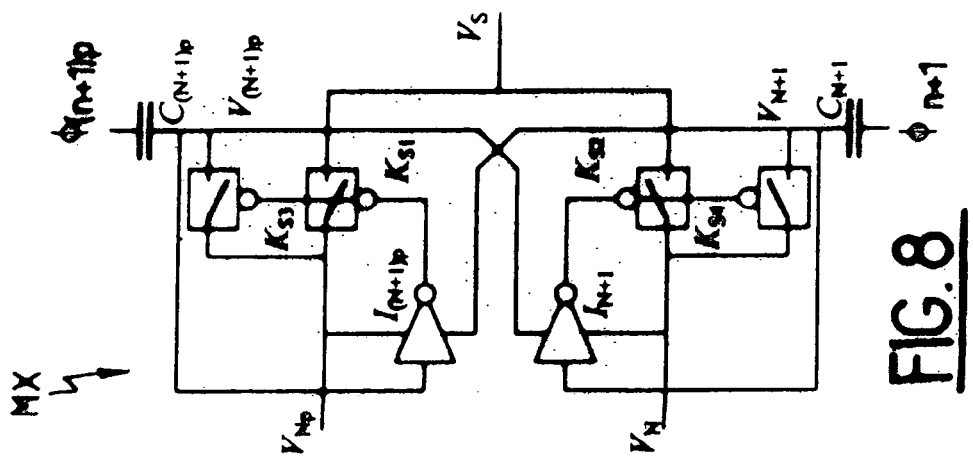
FIGS. 7 and 8 show two respective multiplier circuits each suitable for constituting the output stage of the negative output voltage/voltage converter of FIG. 6.
Figure 7:
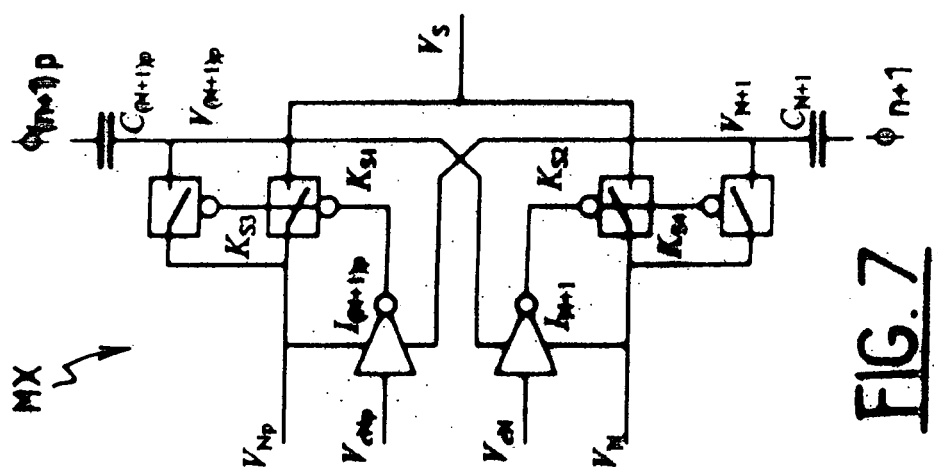

The multiplexer circuit MX constituting the output stage S of the voltage/voltage converter 10 having a negative output as shown in FIG. 6 can be implemented in two ways as shown in FIGS. 7 and 8. The function of the multiplexer circuit MX is to recover the lowest voltages from the voltage multiplier circuits and, by switching, to extract therefrom the lowest DC voltage which forms the output voltage from the converter.

In the first embodiment shown in FIG. 7, the multiplexer circuit MX is based on using two switches $K_{s1}$ and $K_{s2}$ controlled in inverse manner, which, on the output side, share a common output node corresponding to the output voltage $V_s$ of the converter 10, and on the input side are connected respectively to the two output voltages $V_{Np}$ and $V_N$ of the two voltage multiplier circuits $CM_{Np}$ and $CM_N$ of the stage N of the converter 10. The multiplexer circuit MX also comprises an auxiliary circuit for producing the control signals for the two switches $K_{s1}$ and $K_{s2}$, this auxiliary circuit being constituted by two inverter circuits $I_{(N+1)p}$ and $I_{N+1}$, two switches $K_{s3}$ and $K_{s4}$, and two capacitors $C_{(N+1)p}$ and $C_{N+1}$.

The switch $K_{s3}$ shares the same control and input signals as the switch $K_{s1}$, while the switch $K_{s4}$ shares the same control and input signals as the switch $K_{s2}$. However, the switch $K_{s3}$ is connected between the output voltage $V_{Np}$ of the multiplier circuit $CM_{Np}$ of the branch $B_2$ of the stage N of the converter 10 and the negative electrode of the capacitor $C_{(N+1)p}$ whose positive electrode is boosted by the clock signal $\phi_{(n+1)p}$. Symmetrically, the switch $K_{s4}$ is connected between the output voltage $V_N$ of the multiplier circuit $CM_N$ of the branch $B_1$ of the stage N of the converter 10 and the negative electrode of the capacitor $C_{N+1}$ whose positive electrode is boosted by the clock signal $\phi_{n+1}$.

The inverter circuit $I_{(N+1)p}$ has as its input signal the control signal $V_{cNp}$ of the voltage multiplier circuit $CM_{Np}$ of the stage N of the branch $B_2$ of the converter 10, and it is powered between the output voltage $V_{Np}$ as its high power supply voltage and the voltage $V_{N+1}$ as its low power supply voltage. Symmetrically, the inverter circuit $I_{N+1}$ has as its input signal the control signal $V_{cN}$ of the multiplier circuit $CM_N$ of the stage N of the branch $B_1$ of the converter 10, and it is powered between the output voltage $V_N$ as its high power supply and the voltage $V_{(N+1)p}$ as its low power supply.

In the second embodiment shown in FIG. 8, the multiplexer circuit MX reproduces the same overall structure as that shown in FIG. 7. The only difference lies in the fact that the input signal of the inverter circuit $I_{(N+1)p}$ is the signal $V_{(N+1)p}$ instead of the signal $V_{cNp}$, and the input signal of the inverter circuit $I_{N+1}$ is the signal $V_{N+1}$ instead of the signal $V_{cN}$.

Figure 9:
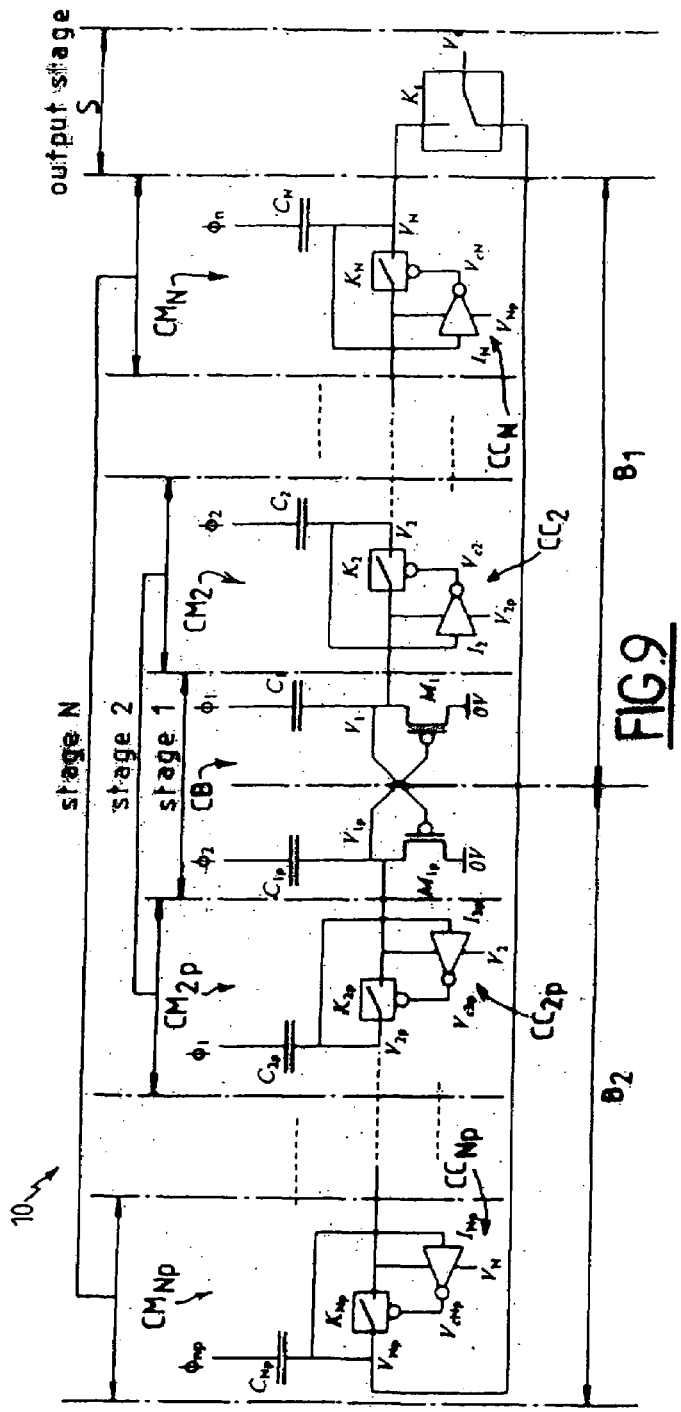
FIG. 9 shows a second embodiment of a voltage/voltage converter in accordance with the invention and having a negative output.

In a second embodiment shown in FIG. 9 and constituting a variant of the embodiment shown in FIG. 6, the voltage/voltage converter 10 likewise has a positive output and differs solely in the control circuits $CC_i$ and $CC_{ip}$ of the voltage multiplier circuits $CM_i$ and $CM_{ip}$ (i lying in the range 2 to N). More precisely, the inverter circuit $I_i$ of each control circuit $CC_i$ is powered between the output voltages $V_{ip}$ and $V_{i-1}$, it being understood that the output voltage $V_{i-1}$ is the voltage produced by the multiplier circuit $CM_{i-1}$ of the preceding stage of the branch $B_1$ of the converter 10, and the output voltage $V_{ip}$ is the voltage produced by the multiplier circuit $CM_{ip}$ of the corresponding stage of the branch $B_2$ of the converter 10. The input of each inverter circuit $I_i$ is controlled by the output signal $V_i$ of the voltage multiplier circuit $CM_i$ to produce the output signal $V_{ci}$. Symmetrically, each inverter circuit $I_{ip}$ of each control circuit $CC_{ip}$ is powered between the output voltages $V_i$ and $V_{(i-1)p}$ it being understood that the output voltage $V_{(i-1)p}$ is produced by the multiplier circuit $CM_{(i-1)p}$ of the preceding stage of the branch $B_2$ of the converted 10, and the output voltage $V_i$ is the voltage produced by the voltage multiplier circuit $CM_i$ of the corresponding stage of the branch $B_1$ of the converter 10. The input of each inverter circuit $I_{ip}$ is controlled by the output signal $V_{ip}$ of the voltage multiplier circuit $CM_{ip}$ to produce the output signal $V_{cip}$.

As for the first embodiment shown in FIG. 6, the multiplexer circuit MX forming the output stage of the converter 10 can be made using either of the two embodiments shown in FIGS. 7 and 8.

The operation of the voltage/voltage converter of order N and having a positive output voltage as shown in FIG. 2 is described below. This operation can be subdivided into two phases, namely: a first phase corresponding to charging the capacitor of the first stage, and a second phase corresponding to transferring the charge stored on the capacitor during the first stage towards the following stage.

Figure 10:
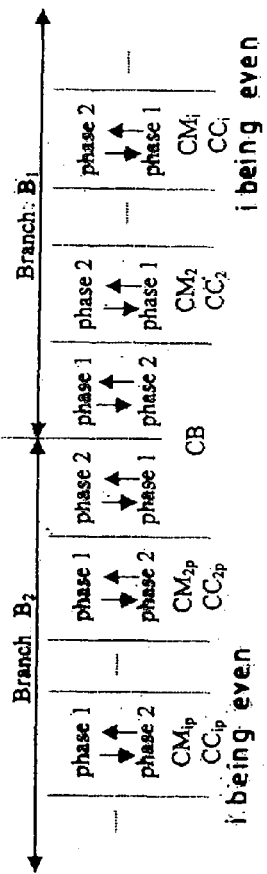
FIGS. 10 and 11a to 11d are views that are used for explaining the operation of the first embodiment of the converter as shown in FIG. 2.
Figure 11A:
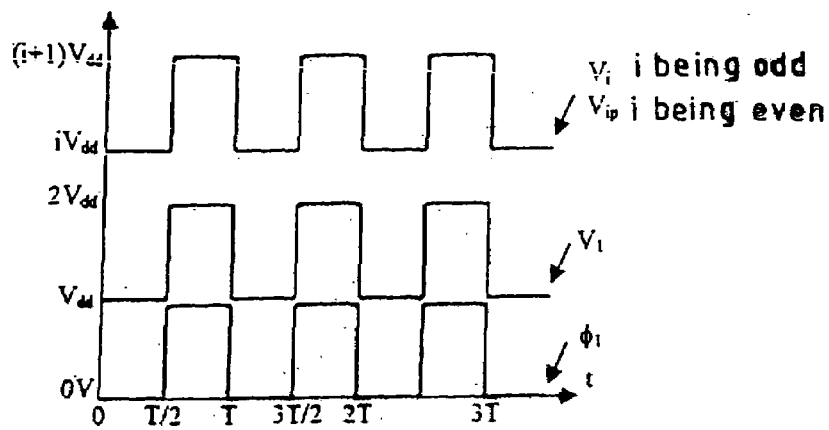
Figure 11B:
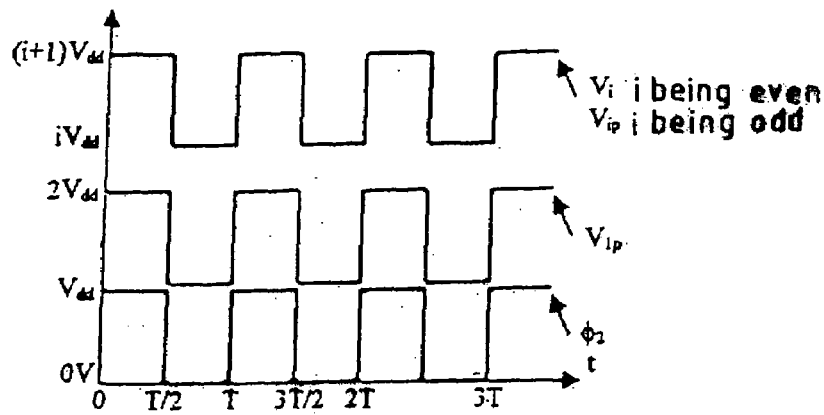

As a preliminary point, with reference to FIG. 10, it is important to understand the following:

the branches $B_1$ and $B_2$ of the converter are in phase opposition, stage by stage, i.e. if stage i of the branch $B_1$ having voltage multiplier circuit $CM_i$ and its control circuit $CC_i$ is in a first operating phase, then stage i of the branch $B_2$ comprising the voltage multiplier circuit $CM_{ip}$ and its control circuit $CC_{ip}$ s then in the second operating phase;

there is also phase inversion between any one stage and its neighbors in each of the branches $B_1$ and $B_2$, i.e. if stage i of branch $B_1$ is in the second operating phase, then stages i−1 and i+1 will be in the first operating phase; and phase switching is controlled both by the clock signals $\phi_1$ and $\phi_2$, and the phase of a stage is changed on each new half-cycle of the clock, i.e. if stage i of branch $B_2$ is in the first operating phase, then it will switch to the second operating stage during the following clock half-cycle, as illustrated in the waveform diagrams of FIGS. 11a to 11d, and in particular the diagrams of FIGS. 11a and 11b.

The first operating phase corresponds to each of the capacitors $C_i$ or $C_{ip}$ of stage i in each branch $B_1$ and $B_2$ being charged, with i lying in the range 2 to N. For each branch $B_1$ and $B_2$, this first phase takes place when the clock signal $\phi_j$ (j=1 or 2) applied to the capacitor $C_i$ or $C_{ip}$ of the stage $CM_i$ (branch $B_1$) or $CM_{ip}$ (branch $B_2$) is at the low level (0 volts), as shown in FIG. 11a for the branch $B_1$ and in FIG. 11b for the branch $B_2$. During this first operating phase, the voltage on the positive electrode of the capacitor $C_i$ (branch $B_1$) or $C_{ip}$ (branch $B_2$) is charged via the switch $K_i$ (branch $B_1$) or $K_{ip}$ (branch $B_2$) which is in the ON state, up to the voltage $V_{i-1}$ (capacitor $C_i$) or to the voltage $V_{(i-1)p}$ (capacitor $C_{ip}$), these voltages being equal to $iV_{dd}$. The state of switch $K_i$ (branch $B_1$) or switch $K_{ip}$ (branch $B_2$) is controlled by a voltage $V_{ci}$ (branch $B_1$) or $V_{cip}$ (branch $B_2$), these voltages equal to $(i+1)V_{dd}$ being supplied via the inverter $I_i$ (branch $B_1$) or $I_{ip}$ (branch $B_2$) that is powered between the voltages $V_{ip}$ (equal to $(i+1)V_{dd}$) and $V_{i-1}$ (equal to $iV_{dd}$) for the branch $B_1$, and $V_i$ (equal to $(i+1)V_{dd}$) and $V_{(i-1)p}$ (equal to $iV_{dd}$) for the branch $B_2$.

Figure 11C:
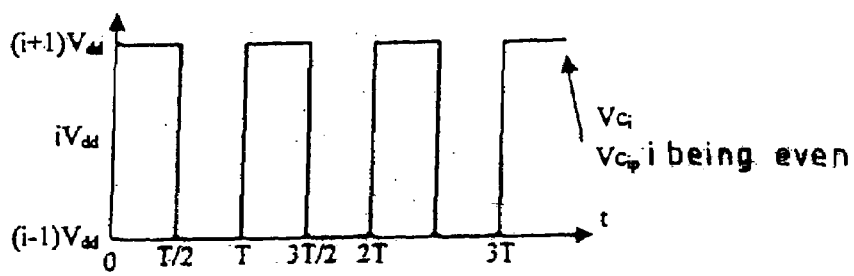
Figure 11D:
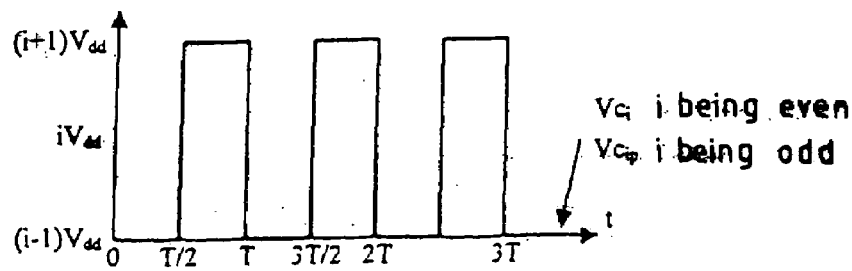

The second operating phase corresponds to stacking the capacitors $C_i$ or $C_{ip}$ of the stage i in each branch $B_1$ or $B_2$ with i lying in the range 2 to N onto the power supply voltage $V_{dd}$. For each branch $B_1$ and $B_2$, this phase takes place while the clock $\phi_j$ (j=1 or 2) connected to the capacitor $C_i$ or $C_{ip}$ of the stage $CM_i$ or $CM_{ip}$ is at the high level ($V_{dd}$). During this phase, the voltage on the positive electrode $V_i$ ($V_{ip}$) of the capacitor $C_i$ ($C_{ip}$) is boosted by $V_{dd}$, thereby raising this voltage to $(i+1)V_{dd}$. The switch $K_i$ ($K_{ip}$) is OFF during the second phase under the control of a voltage $V_{ci}$ ($V_{cip}$) equal to $(i-1)V_{dd}$ as supplied by the inverter $I_i$ ($I_{ip}$), as shown in FIGS. 11c and 11d respectively associated with FIGS. 11a and 11b. The inverter $I_i$ is powered between $V_{ip}$ at $iV_{dd}$ and $V_{i-1}$ at $(i-1)V_{dd}$, while the inverter $I_{ip}$ is powered between $V_i$ at $iV_{dd}$ and $V_{(i-1)p}$ at $(i-1)V_{dd}$.

The two operating phases also apply to the clock booster CB. When the elements of the branch $B_1$ comprising the capacitor $C_1$ associated with the transistor $M_1$ are in the first phase, then the elements in the branch $B_2$ comprising the capacitor $C_{1p}$ associated with the transistor $M_{1p}$ are in the second phase, and then vice versa. The first phase corresponds to charging the capacitor $C_1$ or $C_{1p}$ to $V_{dd}$ via the transistor $M_1$ or $M_{1p}$, and this phase occurs when the clock $\phi_j$ (j=1 or 2) is at its low level (0 volts). The second phase corresponds to stacking the capacitor $C_1$ or $C_{1p}$ onto the clock signal $\phi_j$ at the high level ($V_{dd}$), thereby producing on $V_1$ or $V_{1p}$ a voltage of $2V_{dd}$ as shown in FIGS. 11a and 11b.

By way of example, in an EEPROM that requires a programming voltage of at least 9 V that is derived from a power supply voltage of 3 V supplied by a battery, a voltage/voltage converter of the invention and having only two voltage multiplier stages is sufficient for producing the programming voltage.

The invention claimed is:

1. A voltage/voltage converter for integrated circuits, the converter presenting a symmetrical multistage structure and comprising at least one input stage constituted by a clock booster circuit (CB) of symmetrical structure which delivers two output voltages, a voltage multiplier circuit of symmetrical structure comprising two voltage multiplier circuits ($CM_i$; $CM_{ip}$) respectively connected in two branches ($B_1$; $B_2$) of the converter and having the output voltages of the input stage applied respectively thereto, and an output stage (S) constituted by a multiplexer circuit (MX) having the two output voltages from the voltage multiplier stage applied thereto, the converter being characterized in that each voltage multiplier circuit ($CM_i$; $CM_{ip}$) is controlled by a control circuit ($CC_i$; $CC_{ip}$), and in that each voltage multiplier circuit ($CM_i$; $CM_{ip}$) supplies voltages needed both for the operation of its own control circuit and for the operation of the control circuit of the other voltage multiplier circuit of the same stage.

2. A converter according to claim 1, characterized in that the clock booster circuit (CB) serves to add a DC component to a clock signal, and in that the clock booster circuit (CB) comprises two similar circuits receiving respective clock signals ($\phi_1$; $\phi_2$) of opposite phase.

3. A converter according to claim 1 or claim 2, characterized in that each voltage multiplier circuit ($CM_i$; $CM_{ip}$) comprises a capacitor ($C_i$; $C_{ip}$) and a switch ($K_i$; $K_{ip}$) for controlling charging of the capacitor and transfer of its charge to the voltage multiplier circuit of the following stage.

4. A converter according to claim 3, characterized in that the capacitors ($C_i$; $C_{ip}$) of the two branches ($B_1$; $B_2$) of the voltage multiplier stage have their positive electrodes respectively connected to the outputs of two switches ($K_i$; $K_{ip}$) via two nodes ($V_i$; $V_{ip}$), and their negative electrodes connected to respective clock signals ($\phi_i$), in that an input of each switch ($K_i$; $K_{ip}$) is connected to the output of the preceding stage, and in that the clock signal ($\phi_i$) corresponds either to the signal ($\phi_1$) if (i) is odd for the first branch ($B_1$) and to the signal ($\phi_2$) if (i) is even for the first branch ($B_1$), or to the signal ($\phi_2$) if (i) is odd for the second branch ($B_2$) and to ($\phi_1$) if (i) is even for the second branch ($B_2$).

5. A converter according to claim 1, characterized in that it has a positive output, in that the clock booster circuit (CB) forming the input stage has a positive output and comprises two NMOS transistors and two capacitors, in that the drain of each transistor ($M_1$; $M_{1p}$) is connected to a power supply terminal ($V_{dd}$), the source of each transistor ($M_1$; $M_{1p}$) is connected to the positive electrode of the capacitor ($C_1$; $C_{1p}$) of the associated branch, and the grid of each transistor ($M_1$; $M_{1p}$) is connected to the positive electrode of the capacitor ($C_1$; $C_{1p}$) and to the source of the transistor in the opposite branch, and in that the negative electrodes of the capacitors ($C_1$; $C_{1p}$) are respectively connected to two clock signals ($\phi_1$; $\phi_2$) in phase opposition.

6. A converter according to claim 1, characterized in that the control circuit ($CC_i$) of the voltage multiplier circuit ($CM_i$) of the first branch ($B_1$) is an inverter circuit ($I_i$) which is powered between the voltage ($V_{i-1}$) from the voltage multiplier circuit of the preceding stage in the first branch ($B_1$), and the voltage ($V_{ip}$) from the voltage multiplier circuit of the same stage in the second branch ($B_2$), and in that the inverter ($I_i$) is controlled either by the voltage ($V_{c(i-1)}$) of the preceding voltage multiplier circuit of the first branch ($B_1$) or by the voltage ($V_i$) from the voltage multiplier circuit ($CM_i$) of the first branch ($B_1$).

7. A converter according to claim 1, characterized in that the control circuit ($CC_{ip}$) of the voltage multiplier circuit ($CM_{ip}$) of the second branch ($B_2$) is an inverter circuit ($I_{ip}$) which is powered between the output voltage ($V_{(i-1)p}$) of the voltage multiplier circuit ($CM_{(i-1)p}$) of the preceding stage of the second branch ($B_2$) and the output voltage ($V_i$) of the voltage multiplier circuit ($CM_i$) of the same stage of the first branch ($B_1$), and in that the inverter ($I_{ip}$) is controlled either by the output voltage ($V_{c(i-1)p}$) of the preceding voltage multiplier circuit of the second branch ($B_2$) or by the voltage ($V_{ip}$) of the voltage multiplier circuit ($CM_{ip}$) of the second branch ($B_2$).

8. A converter according to claim 1, characterized in that the voltage circuit (MX) recovers the highest voltages from the voltage multiplier circuits ($CM_i$; $CM_{ip}$) and, by switching, extracts therefrom the highest DC voltage forming the output voltage of the converter.

9. A converter according to claim 8, characterized in that the multiplexer circuit (MX) has a positive output and comprises two switches ($K_{s1}$; $K_{s2}$) connected to the output terminal ($V_s$) of the multiplexer circuit and to the output terminals ($V_{Np}$; $V_N$) of the voltage multiplier stage (N-1), in that the two switches ($K_{s1}$; $K_{s2}$) are controlled by the output signals from two inverter circuits ($I_{(N+1)p}$; $I_{N+1}$), and in that the multiplexer circuit also comprises an auxiliary circuit having the function of generating the control signals for the switches ($K_{s1}$; $K_{s2}$).

10. A converter according to claim 9, characterized in that the auxiliary circuit comprises two inverters ($I_{(N+1)p}$; $I_{N+1}$), two switch circuits ($K_{s3}$; $K_{s4}$), and two capacitors ($C_{(N+1)p}$; $C_{N+1}$).

11. A converter according to claim 10, characterized in that the two switches ($K_{s3}$; $K_{s4}$) share the same control signal and the same input signal as the two switches ($K_{s1}$; $K_{s2}$), in that the switch ($K_{s3}$) is connected between the output voltage ($V_{Np}$) and the positive electrode of the converter ($C_{(N+1)p}$) whose negative electrode is connected to the clock signal ($\phi_{(n+1)p}$), in that the switch ($K_{s4}$) is connected between the output voltage ($V_N$) of the multiplier circuit ($CM_N$) of the first branch ($B_1$) of the stage N of the converter at the positive electrode of the capacitor ($C_{N+1}$) whose negative electrode is connected to the clock signal ($\phi_{n+1}$), and in that the two inverters ($I_{(N+1)p}$; $I_{N+1}$) have respective input signals ($V_{cNp}$; $V_{cN}$) and are respectively powered between the voltages ($V_{Np}$; $V_N$) as their low power supply voltages and ($V_{N+1}$; $V_{(n+1)p}$) as their high power supply voltages.

12. A converter according to claim 10, characterized in that the two switches ($K_{s3}$; $K_{s4}$) have the same control signal and the same input signal as the two switches ($K_{s1}$; $K_{s2}$), in that the switch ($K_{s3}$) is connected between the output voltage ($V_{Np}$) and the positive electrode of the capacitor ($C_{(N+1)p}$) whose negative electrode is connected to the clock signal ($\phi_{(n+1)p}$), in that the switch ($K_{s4}$) is connected between the output voltage ($V_N$) of the multiplier circuit ($CM_N$) and the first branch ($B_1$) of the stage N of the converter and the positive electrode of the capacitor ($C_{N+1}$) whose negative electrode is connected to the clock signal ($\phi_{n+1}$), and it that the two inverters ($I_{(N+1)p}$; $I_{N+1}$) have as their respective input signals ($V_{(N+1)p}$; $V_{N+1}$) and are respectively powered between the voltages ($V_{Np}$; $V_N$) as their low power supply voltages and ($V_{N+1}$; $V_{(N+1)p}$) as their high power supply voltages.

13. A converter according to any one of claims 1 to 3, characterized in that its output is negative, in that the clock booster circuit forming the input stage has a negative output and comprises two PMOS transistors and two capacitors, in that the drain of each transistor ($M_1$; $M_{1p}$) is connected to ground, the source of each transistor ($M_1$; $M_{1p}$) is connected to the negative electrode of the capacitor ($C_1$; $C_{1p}$) of the associated branch, and the grid of each transistor ($M_1$; $M_{1p}$) is connected to the positive electrode of the capacitor ($C_1$; $C_{1p}$) and to the source of the transistor of the opposite branch, and in that the positive electrodes of the capacitors ($C_1$; $C_{1p}$) are respectively connected to two clock signals (($\phi_1$; $\phi_2$) in phase opposition.

14. A converter according to claim 13, characterized in that the capacitors ($C_i$; $C_{ip}$) of the two branches ($B_1$; $B_2$) of the voltage multiplier stage have their positive electrodes respectively connected to the outputs of two switches ($K_i$; $K_{ip}$) via two nodes ($V_i$; $V_{ip}$), and their negative electrodes connected to respective clock signals ($\phi_i$), in that an input of each switch ($K_i$; $K_{ip}$) is connected to the output of the preceding stage, and in that the clock signal ($\phi_i$) corresponds either to the signal ($\phi_1$) if i is odd for the first branch ($B_1$) and to the signal ($\phi_2$) if i is even for the first branch ($B_1$), or to the signal ($\phi_2$) if i is odd for the second branch ($B_2$) and to ($\phi_1$) if i is even for the second branch ($B_2$).

15. A converter according to claim 13 or claim 14, characterized in that the control circuit ($CC_i$) of the voltage multiplier circuit ($CM_i$) of the first branch ($B_1$) is an inverter circuit ($I_i$) which is powered between the voltage ($V_{i-1}$) from the voltage multiplier circuit of the preceding stage in the first branch ($B_1$), and the voltage ($V_{ip}$) from the voltage multiplier circuit of the same stage in the second branch ($B_2$), and in that the inverter ($I_i$) is controlled either by the voltage ($V_{c(i-1)}$) of the preceding voltage multiplier circuit of the first branch ($B_1$) or by the voltage ($V_i$) from the voltage multiplier circuit ($CM_i$) of the first branch ($B_1$).

16. A converter according to any one of claims 13 to 15, characterized in that the control circuit ($CC_{ip}$) of the voltage multiplier circuit ($CM_{ip}$) of the second branch ($B_2$) is an inverter circuit ($I_{ip}$) which is powered between the output voltage ($V_{(i-1)p}$) of the voltage multiplier circuit ($CM_{(i-1)p}$) of the preceding stage of the second branch ($B_2$) and the output voltage ($V_i$) of the voltage multiplier circuit ($CM_i$) of the same stage of the first branch ($B_1$), and in that the inverter ($I_{ip}$) is controlled either by the output voltage ($V_{c(i-1)p}$) of the preceding voltage multiplier circuit of the second branch ($B_2$) or by the voltage ($V_{ip}$) of the voltage multiplier circuit ($CM_{ip}$) of the second branch ($B_2$).

17. A converter according to any one of claims 13 to 16, characterized in that the voltage circuit (MX) recovers the highest voltages from the voltage multiplier circuits ($CM_i$; $CM_{ip}$) and, by switching, extracts therefrom the highest DC voltage forming the output voltage of the converter.

18. A converter according to claim 17, characterized in that the multiplexer circuit (MX) has a positive output and comprises two switches ($K_{s1}$; $K_{s2}$) connected to the output terminal ($V_s$) of the multiplexer circuit and to the output terminals ($V_{Np}$; $V_N$) of the voltage multiplier stage (N−1), in that the two switches ($K_{s1}$; $K_{s2}$) are controlled by the output signals from two inverter circuits ($I_{(N+1)p}$; $I_{N+1}$), and in that the multiplexer circuit also comprises an auxiliary circuit having the function of generating the control signals for the switches ($K_{s1}$; $K_{s2}$).

19. A converter according to claim 18, characterized in that the auxiliary circuit comprises two inverters ($I_{(N+1)p}$; $I_{N+1}$), two switch circuits ($K_{s3}$; $K_{s4}$), and two capacitors ($C_{(N+1)p}$; $C_{N+1}$).

20. A converter according to claim 19, characterized in that the two switches ($K_{s3}$; $K_{s4}$) share the same control signal and the same input signal as the two switches ($K_{s1}$; $K_{s2}$), in that the switch ($K_{s3}$) is connected between the output voltage ($V_{Np}$) and the positive electrode of the converter ($C_{(N+1)p}$) whose negative electrode is connected to the clock signal ($\phi_{(n+1)p}$), in that the switch ($K_{s4}$) is connected between the output voltage ($V_N$) of the multiplier circuit ($CM_N$) of the first branch ($B_1$) of the stage N of the converter at the positive electrode of the capacitor ($C_{N+1}$) whose negative electrode is connected to the clock signal ($\phi_{n+1}$), and in that the two inverters ($I_{(N+1)p}$; $I_{N+1}$) have respective input signals ($V_{cNp}$; $V_{cN}$) and are respectively powered between the voltages ($V_{Np}$; $V_N$) as their low power supply voltages and ($V_{N+1}$; $V_{(n+1)p}$) as their high power supply voltages.

21. A converter according to claim 19, characterized in that the two switches ($K_{s3}$; $K_{s4}$) have the same control signal and the same input signal as the two switches ($K_{s1}$; $K_{s2}$), in that the switch ($K_{s3}$) is connected between the output voltage ($V_{Np}$) and the positive electrode of the capacitor ($C_{(N+1)p}$) whose negative electrode is connected to the clock signal ($\phi_{(n+1)p}$), in that the switch ($K_{s4}$) is connected between the output voltage ($V_N$) of the multiplier circuit ($CM_N$) and the first branch ($B_1$) of the stage N of the converter and the positive electrode of the capacitor ($C_{N+1}$) whose negative electrode is connected to the clock signal ($\phi_{n+1}$), and it that the two inverters ($I_{(N+1)p}$; $I_{N+1}$) have as their respective input signals ($V_{(N+1)p}$; $V_{N+1}$) and are respectively powered between the voltages ($V_{Np}$; $V_N$) as their low power supply voltages and ($V_{N+1}$; $V_{(N+1)p}$) as their high power supply voltages.

* * * * *